July 28, 1959   R. W. MILLER ET AL   2,896,281
TIRE MOLD OR THE LIKE
Filed Sept. 17, 1956
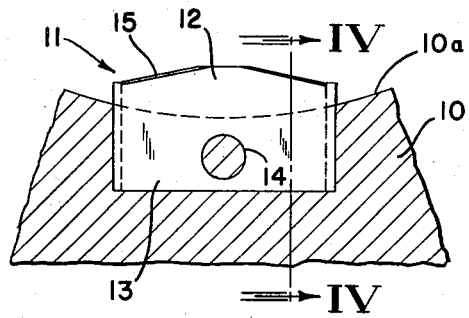
Fig. 1
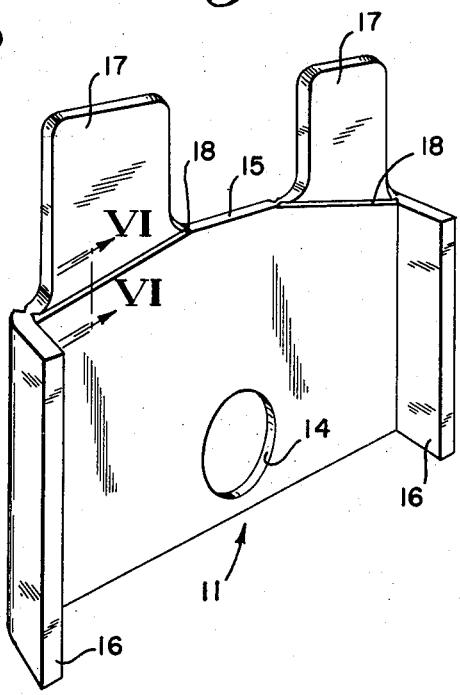
Fig. 3
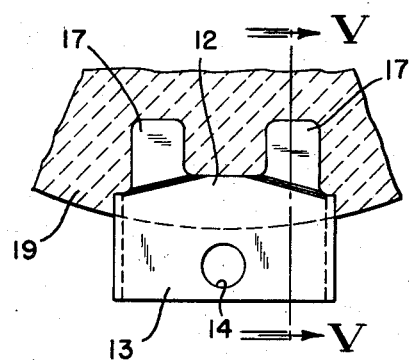
Fig. 2
Fig. 4
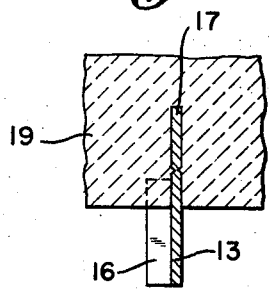
Fig. 5
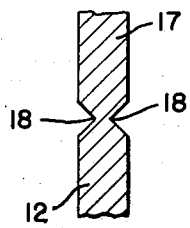
Fig. 6
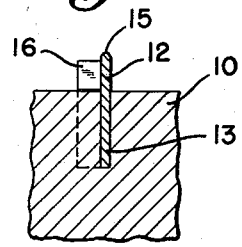
INVENTOR.
ROY W. MILLER
BY ARTHUR W. GRANT
ATTORNEY.

United States Patent Office 2,896,281
Patented July 28, 1959

2,896,281

TIRE MOLD OR THE LIKE

Roy W. Miller and Arthur W. Grant, Detroit, Mich., assignors to United States Rubber Company, New York, N.Y., a corporation of New Jersey Application September 17, 1956, Serial No. 610,090

2 Claims. (Cl. 22—203)

The present invention relates to molds used in the manufacture of tires or similar vulcanized rubber articles.

Such molds may be made of precision cast metals such as aluminum or other ferrous or non-ferrous alloys. The molds are manufactured by pouring the material used for the mold into a suitably shaped form made of plaster, or other investments of suitable material.

Articles such as tires require narrow elongated cavities or slots at various places on the tread of the tire, and to enable the mold to form such cavities or slots, inserts or sipes in the form of blade-like plates are partly embedded in the mold to leave a free portion of the insert extending from the mold in order to form in the finished article cavities or slots having the configurations of the portions of the inserts which project from the mold.

The part of each insert which projects from the finished mold is first pressed or inserted into or otherwise embedded in the plaster or other material used for the form from which the mold is cast, and it is essential that the inserts be securely anchored in the form or investment to guarantee proper location of the inserts in the finished mold. However, an insert designed to form a shallow slot or a cavity of little depth in the finished article projects only to a small extent from the mold and can only be embedded to the same extent into the material of the form used to make the mold. In this event, the connection between the insert and form is insecure, and proper positioning of such an insert with respect to the mold is not assured.

A primary object of the invention is to provide a secure connection between an insert of this latter type and the form used to make the mold.

The objects of the present invention also include providing this secure connection with an insert of simple, inexpensive construction which, in its initial form, comprises only a small amount of material in excess of the insert in its final form in place in the mold.

According to the present invention, the insert is provided with at least one tab-like member or extension at the part thereof which is embedded in the form used to make the mold, in order to increase the area of contact or anchorage between the form and the insert so as to obtain a secure connection. After the form is removed from the completed mold, the tab or extension is removed from the insert.

A further object of the present invention is to render this extension easily removable from the insert.

The invention is illustrated, by way of example, in the accompanying drawings, in which:

Fig. 1 is a fragmentary section of part of a mold and shows in elevation an insert partly embedded in the mold;

Fig. 2 is a fragmentary section of that part of a form used to make the part of the mold shown in Fig. 1 and shows in elevation the insert of Fig. 1 embedded in the form;

Fig. 3 is an enlarged perspective view of the insert in its original condition; and Figs. 4, 5 and 6 are fragmentary sectional views taken respectively along lines IV—IV, V—V, and VI—VI of Figs. 1, 2, and 3, respectively.

In Fig. 1 of the drawings there is shown part of a mold 10 and an insert 11 embedded partly therein. The portion 13 of the insert 11 is embedded, while a free portion 12 extends beyond the face 10a of the mold 10. This free portion 12 of the insert 11 terminates in a free edge 15. The embedded portion 13 may be formed with an opening 14 filled with the material of the mold 10 to assure a secure connection between the insert 11 and the mold 10.

The free portion 12 of the insert is relatively narrow (Fig. 4) and will form only a shallow cavity in the molded article.

The construction of the insert 11 in its original condition is shown considerably enlarged in Fig. 3. The insert is in the form of a thin blade or plate made of a metal such as stainless steel and having a thickness on the order of 0.015 inch, for example. Moreover, the entire insert is quite small. The size of the insert may be appreciated from the fact that the opening 14 has a diameter which may be less than 1/8 inch. In the illustrated example the insert 11 has a pair of end portions 16 extending angularly from the remainder of the insert to form laterally extending cavities. However, the particular configuration of the insert is immaterial to the present invention. The insert also includes, in the illustrated example, a pair of extensions in the form of tabs 17. The faces of the insert are creased or indented with any suitable tool along the junctures between the tabs 17 and the remainder of the insert to provide the latter with V-grooves 18 (Fig. 6). These grooves provide weakened areas facilitating the breaking-off or removal of the tabs.

The mold 10, which may be made of aluminum, is made by pouring the molten material of the mold into a suitable form 19, made of plaster, or other suitable material. Fig. 2 shows the part of the form 19 which determines the shape of the part of the mold 10 shown in Fig. 1.

As is evident from Fig. 2, the portion 12 of the insert 11 is pressed or inserted into or otherwise embedded in the form 19, and the portion 13 to be embedded in the mold projects freely from the form. The portion 12 of the insert is too narrow to provide a secure connection with or anchorage in the form 19. However, the tabs 17 are also embedded in the form to provide together with the portion 12 the desired secure connection. Moreover, the material of the form fills the grooves 18 (Fig. 5) so that these grooves contribute to the security of the connection.

The material of the mold is poured into the form 19 and about the portion 13 of the insert 11. After the material of the mold solidifies, the form is removed to expose portion 12 and tabs 17 of the insert. When the form is made of plaster, the plaster is simply broken away.

Then the tabs are broken off or otherwise removed to provide the structure shown in Figs. 1 and 4. The grooves 18 form weakened areas which make it possible to break the tabs off easily, so that these grooves serve the double purpose of improving the connection between the form 19 and insert 11 and at the same time rendering the tabs easily removable.

Although two tabs 17 are shown in the illustrated example, only one tab may suffice in some cases, and also more than two tabs may be provided when necessary.

Having thus described our invention, what we claim and desire to protect by Letters Patent is:

1. A process for manufacturing a tire mold having a plurality of thin plates partially embedded therein so as to leave free plate portions projecting from the mold face for forming a plurality of shallow slots in a molded tire, said free plate portions projecting from the mold face a distance insufficient to provide adequate anchorage in the form in which the plates are embedded prior to casting the mold, comprising the steps of embedding in the material of a form for the mold the free portions of said plates along with extensions secured thereto so as to provide additional anchorage between the plates and the form, the juncture of the free plate portions with said extensions being weakened to facilitate removal of said extensions, pouring the material of the mold around the form and about the portions of the plates located beyond said embedded free plate portions and extensions and extending from the form so that said extending plate portions are embedded in the material of the mold, removing the form from the mold after the material thereof solidifies so as to expose said free plate portions and said extensions, and breaking off said extensions from said free plate portions at said weakened juncture to leave said free plate portions projecting from the mold surface.

2. A process for manufacturing a tire mold as defined in claim 1, wherein the juncture between the free plate portions and the extensions is weakened by grooves extending along said juncture, said grooves facilitating removal of the extensions from the plates and increasing the additional anchorage afforded by said extensions.

References Cited in the file of this patent

UNITED STATES PATENTS

| | | |
|---|---|---|
| 1,862,908 | Richardson | June 14, 1932 |
| 1,945,358 | Raible | Jan. 30, 1934 |
| 2,224,337 | Bostwick | Dec. 10, 1940 |
| 2,241,996 | Jungham | May 13, 1941 |
| 2,263,001 | Gunsaulus | Nov. 18, 1941 |
| 2,293,789 | Abbott | Aug. 25, 1942 |
| 2,297,017 | Overman | Sept. 29, 1942 |
| 2,736,924 | Bean | Mar. 6, 1956 |
| 2,779,060 | Knox | Jan. 29, 1957 |